US012785725B2

(12) United States Patent
Somashekar et al.

(10) Patent No.: US 12,785,725 B2
(45) Date of Patent: Nov. 3, 2026

(54) MITIGATION OF TRANSMITTED ENERGY ON SUBCARRIERS USING DESTRUCTIVE INTERFERENCE

(71) Applicant: T-MOBILE INNOVATIONS LLC, Overland Park, KS (US)

(72) Inventors: Sharath Somashekar, Leawood, KS (US); Deveshkumar Narendrapratap Rai, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 149 days.

(21) Appl. No.: 18/885,254

(22) Filed: Sep. 13, 2024

(65) Prior Publication Data

US 2026/0081624 A1 Mar. 19, 2026

(51) Int. Cl.
*H04B 1/00* (2006.01)
*H04B 1/04* (2006.01)
*H04L 5/00* (2006.01)

(52) U.S. Cl.
CPC ......... *H04B 1/0057* (2013.01); *H04B 1/0071* (2013.01); *H04B 1/0078* (2013.01); *H04B 1/0458* (2013.01); *H04L 5/0073* (2013.01); *H04L 5/0098* (2013.01)

(58) Field of Classification Search
None
See application file for complete search history.

(56) References Cited

U.S. PATENT DOCUMENTS 9,398,572 B2 7/2016 Zhu et al.
11,184,037 B1 * 11/2021 Shattil .................. H04B 1/0003
11,223,467 B2 1/2022 Holfeld et al.
2011/0165848 A1 7/2011 Gorbachov et al.
2013/0242885 A1 9/2013 Zhu et al.
2014/0038675 A1 2/2014 Khlat et al.
2016/0380592 A1 12/2016 Rajendran et al.
2019/0174506 A1 6/2019 Willis, III et al.
2021/0083635 A1 3/2021 Kim et al.
2021/0194515 A1 6/2021 Go et al.
2022/0029761 A1 1/2022 Su et al.
2023/0031214 A1 2/2023 Gianinni et al.
(Continued)

FOREIGN PATENT DOCUMENTS

WO WO-2019225970 A1 * 11/2019 ............ H04W 72/21

OTHER PUBLICATIONS

International Search Report and Written Opinion received for PCT Patent Application No. PCT/US2025/045870, mailed on Nov. 26, 2025, 10 pages.
(Continued)

*Primary Examiner* — Matthew A Fry

(74) *Attorney, Agent, or Firm* — Shook, Hardy & Bacon L.L.P.

(57) ABSTRACT

Embodiments of the present disclosure are directed to systems and methods for mitigating energy transmitted on subcarriers in a communications network. For example, a signal intended for transmission may be allocated with blanked Physical Resource Blocks (PRBs) and non-blanked PRBs. In order to reduce residual energy transmission within the blanked PRBs, selective filtering may be applied to a post-amplified waveform to mitigate unwanted energy introduced or exacerbated by power amplifiers in the communications network.

20 Claims, 6 Drawing Sheets

(56) References Cited

U.S. PATENT DOCUMENTS

| | | | | |
|---|---|---|---|---|
| 2023/0074893 | A1 | 3/2023 | Zhang et al. | |
| 2023/0102171 | A1 | 3/2023 | Su et al. | |
| 2023/0171821 | A1* | 6/2023 | Timson | H04W 24/02 370/329 |
| 2023/0300867 | A1* | 9/2023 | Wang | H04J 11/0033 370/330 |
| 2024/0049149 | A1 | 2/2024 | Wigren et al. | |
| 2024/0098719 | A1 | 3/2024 | Sienkiewicz et al. | |
| 2024/0107328 | A1 | 3/2024 | Ramalingam et al. | |
| 2024/0188145 | A1 | 6/2024 | Rajendran et al. | |
| 2024/0244532 | A1 | 7/2024 | Farhoodi | |
| 2024/0405851 | A1* | 12/2024 | Somashekar | H04B 7/18513 |
| 2026/0025798 | A1 | 1/2026 | Alasti et al. | |

OTHER PUBLICATIONS

Non-Final Office Action received for U.S. Appl. No. 18/885,044, mailed on Jun. 5, 2026, 16 pages.

Notice of Allowance received for U.S. Appl. No. 18/885,085, mailed on Jun. 16, 2026, 9 pages.

Non-Final Office Action received for U.S. Appl. No. 18/885,229, mailed on Jun. 29, 2026, 12 pages.

* cited by examiner

MITIGATION OF TRANSMITTED ENERGY ON SUBCARRIERS USING DESTRUCTIVE INTERFERENCE

SUMMARY

The present disclosure is directed, in part, to mitigating energy transmitted on subcarriers in a communications network by using destructive interference, substantially as shown and/or described in connection with at least one of the figures, and as set forth more completely in the claims.

According to various aspects of the technology, communication networks typically provide a range of services, including voice, text, and data transmissions to facilitate communication among users through, for example, base stations and/or user equipment. In modern communications networks, Physical Resource Block (PRB) blanking is used to help mitigate interference and improve network performance. However, despite the implementation of PRB blanking, residual energy transmission within the blanked PRBs continues to pose challenges for operators. This issue arises due to various factors, including spectral leakage, sidelobes from modulation techniques, and the imperfect performance (e.g., nonlinearity) of power amplifiers (PAs). These unwanted energy transmissions within the blanked PRBs can have detrimental effects on the communications network. They lead to increased interference, reducing the quality of service for users and potentially causing errors in data transmission. Furthermore, this interference can extend beyond the intended network, affecting other nearby communication networks operating in adjacent frequency bands. As a result, the efficiency and reliability of the entire communication ecosystem can become compromised.

To address the problem of residual energy transmission on blanked PRBs, destructive signaling can be used. For example, by monitoring a Digital-to-Analog Converter (DAC) of a Radio Unit (RU) in a user equipment (UE) or a base station that contains the blanked PRB waveform, another waveform can be specifically generated to cancel out the residual energy within the blanked PRBs by destructively interfering with the portion of the output having the blanked PRBs. After the waveforms have been coherently summed together to cancel out the unwanted energy within the blanked PRBs, the summed signal can then be sent to an amplifier. By doing so, the interference caused by spectral leakage, sidelobes from modulation techniques, and power amplifier nonlinearity, etc., is significantly reduced, leading to improved network performance and a higher quality of service for users. This approach not only enhances the efficiency and reliability of the communications network but also minimizes interference with nearby communications networks operating in adjacent frequency bands.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

DETAILED DESCRIPTION

Figure 1:
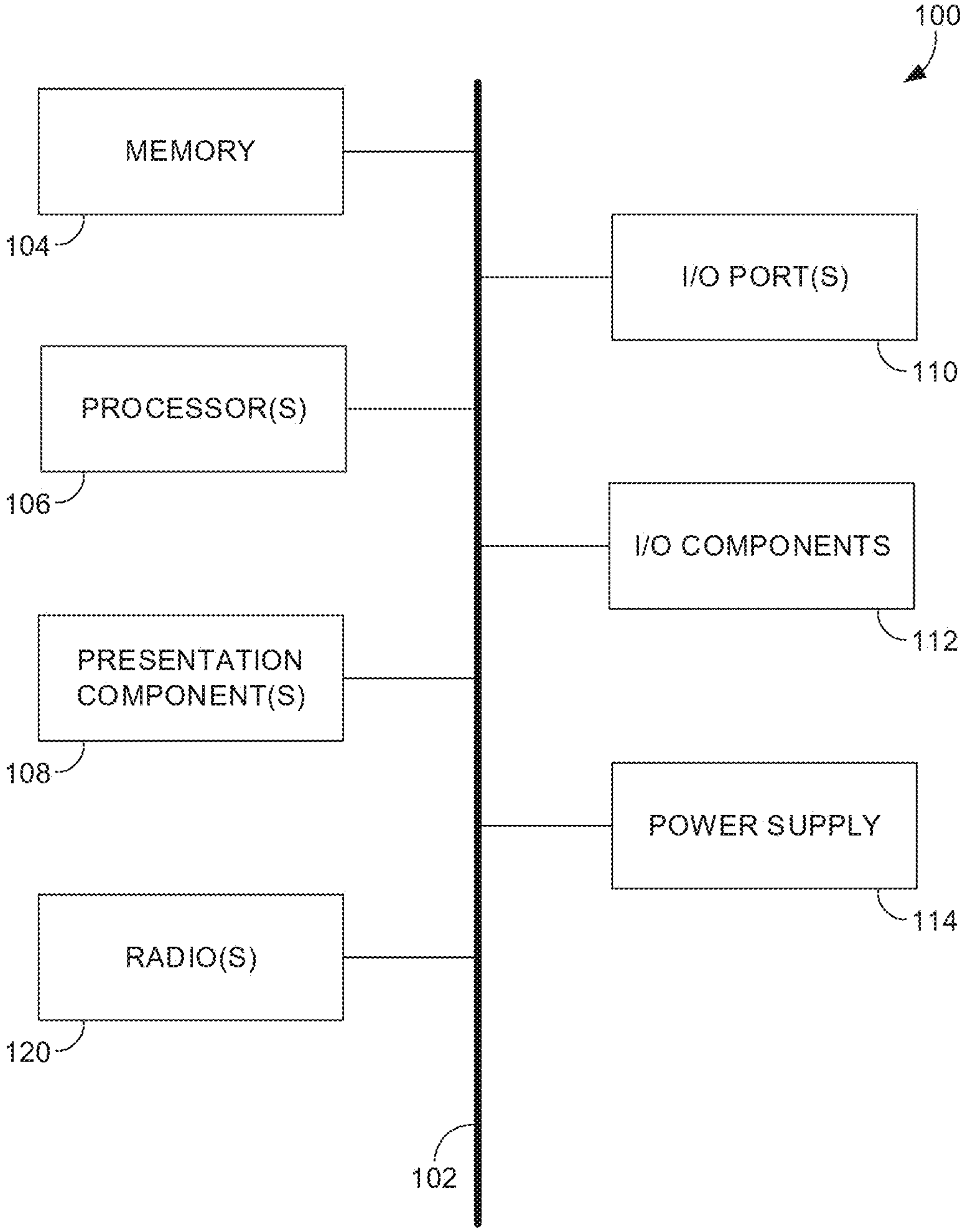
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022).

The example aspects and embodiments described in the present disclosure are provided within the context of a wireless telecommunication network for illustrative purposes. However, it should be understood that the principles and techniques discussed herein are not limited to wireless networks alone. The concepts and methodologies can be equally applied to other types of communication networks, including but not limited to wired, satellite, and optical networks. These alternative networks are capable of supporting the functionalities and applications described, and their use falls within the scope of the present disclosure.

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

As used herein, the term "base station" or "cell" refers to a centralized component or system of components that is configured to wirelessly communicate (receive and/or transmit signals) with a plurality of stations (i.e., wireless communication devices, also referred to herein as user equipment (UE(s))) in a particular geographic area. As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like.

"User equipment" (UE), "user device," "mobile device," and "wireless communication device" are used interchangeably to refer to a device having hardware and software that is employed by a user in order to send and/or receive electronic signals/communication over one or more networks. User devices generally include one or more antennas coupled to a radio for exchanging (e.g., transmitting and receiving) transmissions with an in-range base station that also has an antenna or antenna array. In aspects, user devices may constitute any variety of devices, such as a personal computer, a laptop computer, a tablet, a netbook, a mobile phone, a smartphone, a personal digital assistant, a wearable device, a fitness tracker, or any other device capable of communicating using one or more resources of the network. User devices may include components such as software and hardware, a processor, a memory, a display component, a power supply or power source, a speaker, a touch-input component, a keyboard, and the like. In various examples or scenarios that may be discussed herein, user devices may be capable of using 5G technologies with or without backward compatibility to prior access technologies, although the term is not limited so as to exclude legacy devices that are unable to utilize 5G technologies, for example.

The term "radio unit" (RU) is used herein to refer to one or more software and hardware components that facilitate sending and receiving wireless radio frequency signals, for example, based on instructions from a base station. A RU may be used to initiate and generate information that is then sent out through the antenna array, for example, where the radio and antenna array may be connected by one or more physical paths. A RU may comprise such things as a DAC, an amplifier, an antenna array, and/or a controller (e.g., a destructive signaling controller). Generally, an antenna array comprises a plurality of individual antenna elements. The antennas discussed herein may be dipole antennas having a length, for example, of ¼, ½, 1, or 1½ wavelengths. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

The term "baseband unit" (BBU) is used herein to refer to one or more software and hardware components that facilitates processing digital signals before transmission (e.g., a baseband signal). A BBU may be used to handle various protocol layers, including Medium Access Control (MAC), Radio Link Control (RLC), and Packet Data Convergence Protocol (PDCP), which help ensure proper data formatting, sequencing, and error handling. A BBU may also manage the flow of data between the network core and the RU, ensuring that user data, control signals, and other necessary information are efficiently processed and transmitted. A BBU may comprise such things as a scheduler, a Digital Signal Processor (DSP), and/or a controller (e.g., a destructive signaling controller).

"Physical resource block" (PRB) is used to refer to a defined quantity of consecutive subcarriers in a frequency domain that is used for wireless transmission and wireless reception of waveform signals via antennas/antenna elements. In some instances, a physical resource block has a defined quantity of consecutive subcarriers in a frequency domain within one slot in a time domain (e.g., LTE). In other instances, a physical resource block has a defined quantity of consecutive subcarriers in a frequency domain independent of the time domain (e.g., 5G NR). In one example, one resource block has twelve consecutive subcarriers of a frequency domain, where one subcarrier corresponds to one resource element in the resource block. The bandwidth of various physical resource blocks is dependent on the numerology and subcarrier spacing utilized, which corresponds to the frequency bands as defined in kilohertz (kHz) and which determines the cyclic prefix of said block in milliseconds (ms). For example, 5G NR technology supports subcarrier spacing of 15, 30, 60, 120, and 240 kHz while LTE technology supports only one subcarrier spacing of 15 kHz. The physical resource blocks form bandwidth parts (BWP). The physical resource blocks discussed herein are compatible and usable in LTE, LTE-M, 3G, 4G, 5G, IoT, IIoT, NB-IoT, and similar technologies without limitation. For this reason, physical resource blocks are discussed herein in a network-agnostic manner, as the aspects discussed herein can be implemented within each of the different technology environments.

By way of background, PRB blanking is an interference management technique employed in modern communication networks and may be employed at base stations and/or user equipment. In these networks, data transmission may be organized into resource blocks, each of which spans a specific number of subcarriers in the frequency domain and a certain number of symbols in the time domain. Efficient and effective management of these resource blocks is helpful for optimizing network performance and ensuring reliable communication. One of the purposes of PRB blanking is to reduce inter-cell and intra-cell interference, particularly in scenarios with both macro cell and small cells. In such environments, high-power macro cell transmissions can cause significant interference to nearby low-power small cells or user equipment. By strategically blanking certain PRBs, the network can lower interference in both the time and frequency intervals, allowing small cells and other low-power nodes to operate more effectively.

Despite the strategic implementation of PRB blanking to manage interference in communications networks, residual energy transmission within the blanked PRBs remains a persistent issue in real-world scenarios. This problem arises from several technical factors that complicate the ideal functioning of PRB blanking. In practice, the finite response of filters and the inherent sidelobes generated by some modulation techniques lead to spectral leakage, where some energy spills into adjacent frequencies, including those designated as blanked PRBs. Moreover, power amplifiers (PAs), which are important for boosting the signal strength for transmission, often exhibit nonlinear behavior. This nonlinearity results in the generation of harmonics and intermodulation products that further contaminate the blanked PRBs with unwanted energy. Additionally, since amplifiers do not completely turn off, residual energy may still be transmitted on blanked PRBs even when the blanked PRBs carry no information. These imperfections in the amplification and modulation processes cause energy to be transmitted within the blanked PRBs, undermining the intended interference mitigation. For example, the interference levels may degrade the quality of service for users and lead to higher error rates and reduced data throughput. Furthermore, this interference may not be confined to the intended network alone but may also affect nearby communications networks operating in adjacent frequency bands, causing broader spectrum management issues. As a result, the efficiency and reliability of both the local network and the surrounding communication infrastructure may become compromised, highlighting the need for more effective solutions to address this issue.

To address the issue of residual energy transmission in blanked PRBs, the present disclosure is directed to systems and methods for mitigating energy transmitted on subcarriers in a communications network by using destructive signaling. The process may begin with monitoring the output of the DAC, which produces a waveform comprising blanked PRBs. A scheduler, which manages resource allocation and signal transmission schedules, may work in conjunction with a destructive signaling controller. For example, the scheduler may provide the DSC with scheduling data, including which PRBs are to be blanked. Additionally, or alternatively, the DSC may determine the output of the DAC by receiving data from the DSP, which processes digital signals and prepares them for conversion by the DAC. The destructive signaling controller may use this data to understand the structure of the waveform that will be produced by the DAC and identify where residual energy might be present within DAC output. The destructive signaling controller may then generate a compensating waveform that is designed to destructively interfere with the residual energy in the blanked PRBs. To achieve this, the controller may calculate the necessary amplitude and phase of the compensating waveform to ensure it is coherent with the DAC output. The compensating waveform may then be summed with the DAC output in a process known as coherent summing. This process helps ensure that the combined signal has minimal residual energy within the blanked PRBs due to the destructive interference. In other words, the summing operation may effectively cancel out the unwanted energy, leaving a clean signal that only contained energy on the non-blanked PRBs. The resulting signal, now free from significant residual energy in the blanked PRBs, may then be then sent to a power amplifier. The power amplifier may boost the signal to the required transmission power level while maintaining the integrity of the modified waveform. By helping ensure that the amplified signal only has energy on the non-blanked PRBs, interference is effectively reduced within the network and with adjacent frequency bands.

In some aspects, the controller may operate in close communication with the network scheduler, which may employ machine learning (ML) algorithms to predict interference patterns and optimize generation of destructive signaling dynamically. For example, based on the scheduler's instructions and/or data from a DSP, the controller can intelligently predict the appropriate waveform to destructively interfere with energy within the blanked PRBs. This destructive signaling may be performed before the amplification stage, helping ensure that no residual energy from these PRBs is amplified and transmitted.

Accordingly, a first aspect of the present disclosure is directed to a system for mitigating energy transmitted on subcarriers in a communications network. The system includes a radio unit and a network device comprising one or more processors. The system further includes a non-transitory computer-readable media configured to receive scheduling data associated with a first waveform. The media is further configured to determine, based on the scheduling data, that a first band of the first waveform comprises blanked PRBs and generating a second waveform that, when summed with the first waveform, destructively interferes with the first band. The media is further configured to sum the first waveform with the second waveform to form a summed waveform.

A second aspect of the present disclosure is directed to a non-transitory computer-readable media that, when executed, cause a user equipment comprising one or more processors to perform operations for mitigating energy transmitted on subcarriers in a communications network. For example, the computer-readable media is configured to monitor an output of a DAC comprising a plurality of blanked PRBs and a plurality of non-blanked PRBs. The media is further configured to generate a waveform that, when summed with the output of the DAC, forms a summed waveform that only has energy on the plurality of non-blanked PRBs, and to sum the output of the DAC with the generated waveform to form the summed waveform.

A third aspect of the present disclosure is directed to a method for mitigating energy transmitted on subcarriers in a communications. The method includes generating a first waveform, the first waveform comprising a first plurality of PRBs and a second plurality of PRBs. The method further includes generating a second waveform that, when summed with the first waveform, forms a summed waveform that only transmits energy on the second plurality of PRBs. The method further includes summing the first waveform with the second waveform to form the summed waveform and transmitting the summed waveform to an amplifier.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment (UE), wireless communication device, or user device, The computing device 100 may take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media of the computing device 100 may be in the form of a dedicated solid state memory or flash memory, such as a subscriber information module (SIM). Computer storage media does not comprise a propagated data signal.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

The radio 120 represents one or more radios that facilitate communication with one or more wireless networks using one or more wireless links. While a single radio 120 is shown in FIG. 1, it is expressly contemplated that there may be more than one radio 120 coupled to the bus 102. In aspects, the radio 120 utilizes a transmitted to communicate with a wireless telecommunications network. It is expressly contemplated that a computing device 100 with more than one radio 120 could facilitate communication with the wireless network via both the first transmitter and additional transmitters (e.g. a second transmitter). Illustrative wireless telecommunications technologies include CDMA, GPRS, TDMA, GSM, and the like. The radio 120 may carry wireless communication functions or operations using any number of desirable wireless communication protocols, including 802.11 (Wi-Fi), WiMAX, LTE, 3G, 4G, LTE, 5G, NR, VoLTE, or other VoIP communications. As can be appreciated, in various embodiments, radio 120 can be configured to support multiple technologies and/or multiple radios can be utilized to support multiple technologies. A wireless telecommunications network might include an array of devices, which are not shown as to obscure more relevant aspects of the invention. Components such as a base station or communications tower (as well as other components) can provide wireless connectivity in some embodiments.

Figure 2:
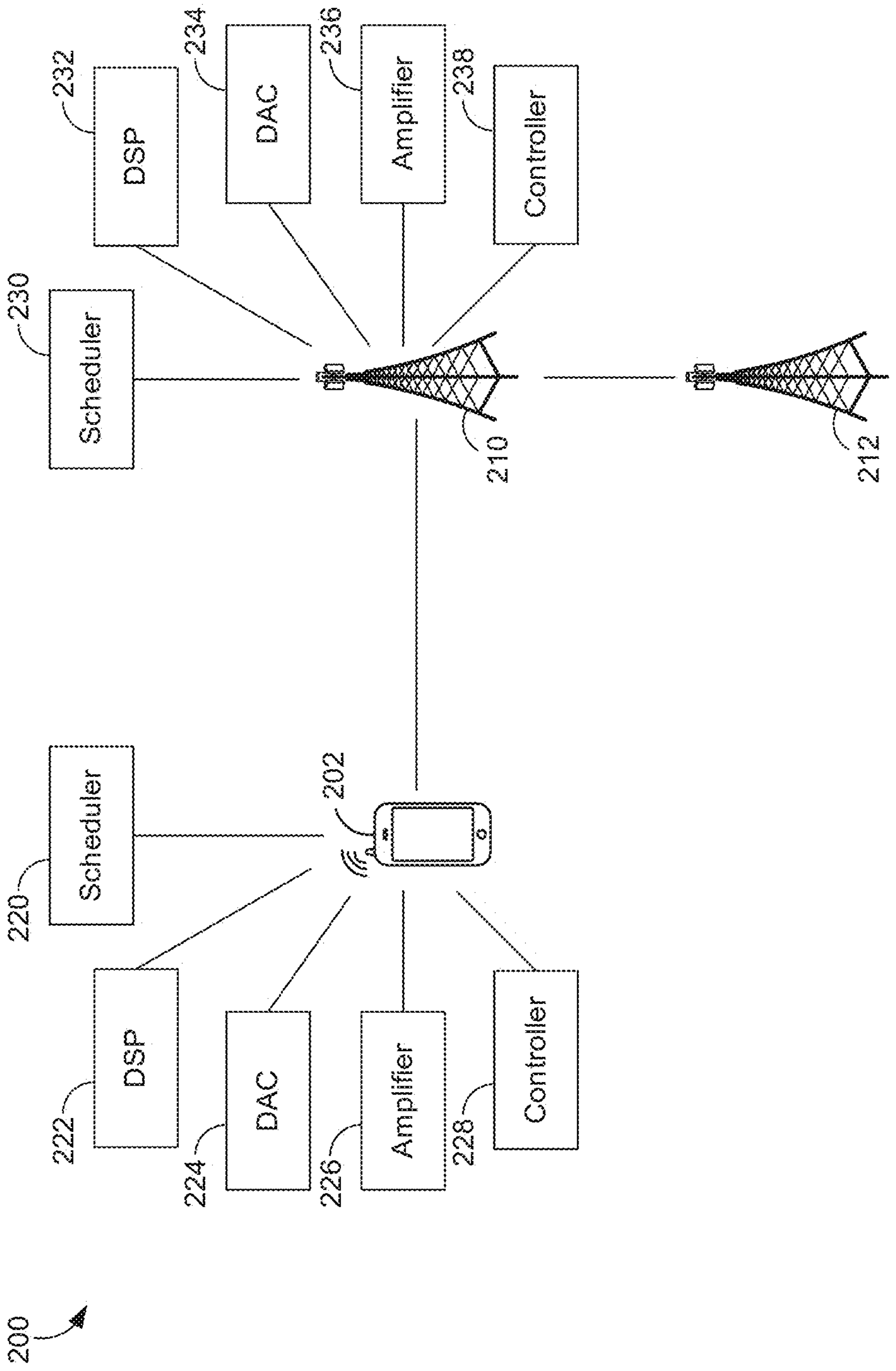
FIG. 2 illustrates a diagram of an exemplary network environment in which implementations of the present disclosure may be employed.

Referring now to FIG. 2, an exemplary network environment is illustrated in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 represents a high level and simplified view of relevant portions of a modern wireless telecommunication network. At a high level, the network environment 200 may generally be said to comprise one or more UEs, such as UE 202, one or more base stations, such as a first base station 210 and/or a second base station 212, and additional components of a radio unit (RU) at the first UE 202 and the first base station 210, though in some implementations, it may not be necessary for certain features to be present. For example, in some aspects, the network environment 200 may not comprise the second base station 212 (e.g., when the first UE 202 is transmitting toward the first base station 210) and/or may not comprise the first UE 204 (e.g., when the first base station 210 is transmitting toward the second base station 212). The network environment may include a number of routers, switches, and the like. The network environment 200 is generally configured for wirelessly connecting the first UE 202 to data or services that may be accessible on one or more application servers or other functions, nodes, or servers not pictured in FIG. 2 so as to not obscure the focus on the present disclosure.

The network environment 200 comprises the first UE 202, which is illustrated generally, and may take any number of forms, including a tablet, phone, or wearable device, or any other device discussed with respect to FIG. 1 and may have any one or more components or features of the computing device 100 of FIG. 1. In some aspects, the first UE 202 may not be a conventional telecommunications devices (i.e., a device that is capable of placing and receiving voice calls), but may instead take the form of devices that only utilizes wireless network resources in order to transmit or receive data; such devices may include IoT devices (e.g., smart appliances, thermostats, locks, smart speakers, lighting devices, smart receptacles, and the like).

The network environment 200 comprises one or more of the first base station 210 and/or the second base station 212 to which the first UE 202 may potentially connect to (also referred to as 'camping on,' 'attaching,' in the industry). Though network environment 200 is illustrated with both the first base station 210 and the second base station 212, one skilled in the art will appreciate that more or fewer base stations may be present in any particular network environment. Furthermore, the first base station and the second base station 212 may have any one or more components or features of the computing device 100 of FIG. 1. Each of the first base station 210 and the second base station 212 of the network environment 200 is configured to wirelessly communicate with UEs, such as the first UE 202 and/or other base stations (e.g., such as each other). In aspects, any of first base station 210 and the second base station 212 may communicate with one or more of the first UE 202 or each other using any wireless telecommunication protocol desired by a network operator, including but not limited to 3G, 4G, 5G, 6G, 802.11x and the like. However, in some aspects, signals from the first UE 202, the first base station 210, and/or the second base station 212 may be transmitted towards one another without being in direct communication with one another. For example, energy transmitted on blanked PRBs in the signals can cause interference between base stations and user equipment within a communications network as well as external networks by the energy transmissions in certain bands of the transmitted signals.

The network environment 200 comprises components of the radio units on the first UE 202 and the first base station 210. As discussed previously, the term "radio unit" (RU) may refer to one or more software and hardware components that facilitate sending and receiving wireless radio frequency signals. A RU may convert digital to radio signals for outgoing transmissions and convert radio signals back into digital data for processing. The illustrated components of the first UE 202 include a scheduler 220, a Digital Signal Processor (DSP) 222, a Digital-to-Analog Converter (DAC) 224, an amplifier 226, and/or a controller 228. Similarly, the illustrated components for the first base station 210 include a scheduler 230, a Digital Signal Processor (DSP) 232, a Digital-to-Analog Converter (DAC) 234, an amplifier 236, and/or a controller 238. Additional components may be present but are not illustrated and/or discussed for the sake of clarity. For example, it may be understood that the second base station 212 has similar components, although not illustrated.

The schedulers 220,230 help by efficiently allocating resources to ensure optimal performance and adherence to system constraints. Specifically, when dealing with blanked PRBs, the schedulers 220,230 must strategically manage the distribution of available PRBs to various users and services. Blanked PRBs are intentionally left unused to avoid interference and/or to meet certain regulatory requirements. By dynamically adapting to real-time conditions and considering the presence of blanked PRBs, the schedulers 220,230 help to optimize the use of available resources, maintain signal quality, and enhance the overall efficiency of the system. The schedulers 220,230 interact with the other components in the radio units. For example, in the context of the first UE 202, the scheduler 220 may interact with the DSP 222, the DAC 224, and the amplifier 226 by determining the optimal allocation of resources and transmission parameters, then instructing these components to implement the planned signal transmissions. The scheduler 220 may help ensure that the DSP 222 processes the signal appropriately, that the DAC 224 modulates the signal appropriately, and that the amplifier 234 provides the necessary power levels to transmit the signal towards its intended recipient (e.g., from an antenna array). Scheduler 230 may provide similar functionality for the first base station 210.

The DSPs 222,232 may play a role in preparing signals for transmission, including handling PRB blanking, by generating and processing a digital signal for transmission. For example, the DSPs 222,232 may receive scheduling data from the schedulers 220,230 to let the DSPs 222,232 know which parts of the signal (e.g., a first band of a first waveform) need to be processed differently (e.g., blanking PRBs on the first band). The DSPs 222,232 may modulate the data into the appropriate format for transmission using known modulation techniques. Based on the instructions from the schedulers 220,230, the DSPs 222,232 may allocate data to the designated PRBs and help ensure that the blanked PRBs do not carry any user data. Instead, the DSPs 222,232 insert a null in these blanked PRBs to indicate that they are not to be used to transmit user data. After constructing the complete digital waveform, incorporating both the blanked and non-blanked PRBs, the signal may be prepared for conversion to an analog signal by the DACs 224,234.

The DACs 224,234 convert the digital signal from the DSPs 222,232 into analog signal suitable for transmission over the air. The DACs 224,234 operate by taking the digital signals and using them to produce a continuous current that corresponds to the digital values. This conversion process results in an analog signal produced by the DACs 224,234 that includes both the desires transmission in the non-blanked PRBs and the residual energy in the blanked PRBs. Despite the effort to blank certain PRBs, some residual energy may still exist due to imperfections such as spectral leakage and nonlinearity discussed previously. This residual energy can interfere with adjacent signals and degrade overall network performance. Conventionally, this output of the DACs 224,234 would then be sent to the amplifiers 226,236.

The amplifiers 226,236 may refer to a device that increases the power of a signal to ensure it can be transmitted over longer distances without degradation. The amplifiers 226,236, as discussed herein, may encompass both driver amplifiers and power amplifiers. Driver amplifiers are typically used to provide the necessary gain to drive the input of a subsequent stage, such as a power amplifier. Driver amplifiers operate at lower power levels and serve to prepare the signal for final amplification. Power amplifiers, on the other hand, operate at higher power levels and are responsible for providing the final boost to the signal. When referring to the amplifiers 226,236, it could mean one or more amplifiers (e.g., a plurality of amplifiers) and include any combination of driver amplifiers, power amplifiers, or multiple units of either type. After amplification the signals may be sent to antenna arrays that help with shaping and directing the signal for transmission. The antenna arrays may take the input signal and applies beamforming techniques to focus the transmission towards the intended target. The ultimate signal transmitted by the antenna arrays may be a radio frequency signal.

The destructive signaling controllers 228,238 may be a newly added component or may be integrated into an existing component, such as the schedulers 220,230, the DSPs 222,232, or the DACs 224,234. The controllers 228, 238 described herein may be implemented as hardware, software, or a combination of both. For example, the controllers 228,238 may comprise new signal generation components or may leverage existing hardware in the UE or base station. The specific implementation may vary depending on system requirements and design considerations. The controllers 228,238 may be responsible for coordinating and executing the destructive interference of PRB blanked portions of a signal intended for transmission in a communications network.

Unlike conventional means where a DAC may simply convert the digital signal into an analog signal and send to a power amplifier, the output of the DACs 224,234 (e.g., a first waveform) may be further refined using controllers 228,238 to mitigate residual energy in blanked PRBs (e.g., destructively interfering with a first plurality of PRBs) such that energy is only transmitted on non-blanked PRBs (e.g., a second plurality of PRBs). This approach may involve generating a compensating waveform (e.g., a second waveform) that destructively interferes with the unwanted residual energy, helping to ensure a cleaner signal for transmission.

In order to further refine the output of the DACs 224,234, the controllers 228,238 may monitor the output of the DACs 224,234 and may use the digital signal data from the DSPs 222,232 and/or scheduling data from the schedulers 220,230 to predict the characteristics of the residual energy in the blanked PRBs. This prediction may involve analyzing the intended transmission's data to understand the specific frequencies and amplitudes of the unwanted residual energy. Furthermore, machine learning algorithms may be implemented at the controllers 228,238 to further refine this predictive process. Based on these data and determinations (e.g., determining, based on the scheduling data and/or digital input signal, that a first band of the first waveform comprises blanked PRBs), the controllers 228,238 may generate a compensating waveform (e.g., an inverse of the residual energy within the blanked PRBs). By matching the phase and amplitude of the unwanted signals in the blanked PRBs, the compensating waveform may help ensure that, when the compensated waveform is summed with the output of the DACs 224,234, it will destructively interfere with the residual energy within the blanked PRBs. For example, the peaks in portions of the of the output of the DACs 224,234 comprising blanked PRBs may align with the troughs of the compensating waveform, effectively canceling it out.

After the compensated waveform is generated, it may be summed with the output of the DACs 224,234 by the controllers 228,238 in a coherent manner, for example, by aligning the phase and timing of the compensating waveform with the output of the DACs 224,234 to help ensure destructive interference. The result may be a modified analog signal (e.g., a summed waveform) where the blanked PRBs have minimal residual energy, significantly reducing interference. This modified signal can now be sent to the amplifiers 226,236 where the signal's power level can be boosted for final transmission to the intended recipient. Because the signal has been refined by the controllers 228,238 to minimize residual energy in the blanked PRBs, the amplified signal maintains high integrity with reduced interference impacting both the network and adjacent frequency bands.

In a practical implementation, the controllers 228,238 may continuously monitor the outputs of the DACs 224,234 and generate compensating waveforms based on scheduling data from the schedulers 220,230 and/or digital signal data from the DSPs 222,232 to help ensure real-time summing and signal refinement before amplification. By implementing such a process, the communications network can achieve a higher quality of service, reduced interference, and improved overall network performance. Such a process helps ensure that even the residual energy within blanked PRBs is effectively managed, enhancing the efficiency and reliability of signal transmission in the communications network.

Figure 3:
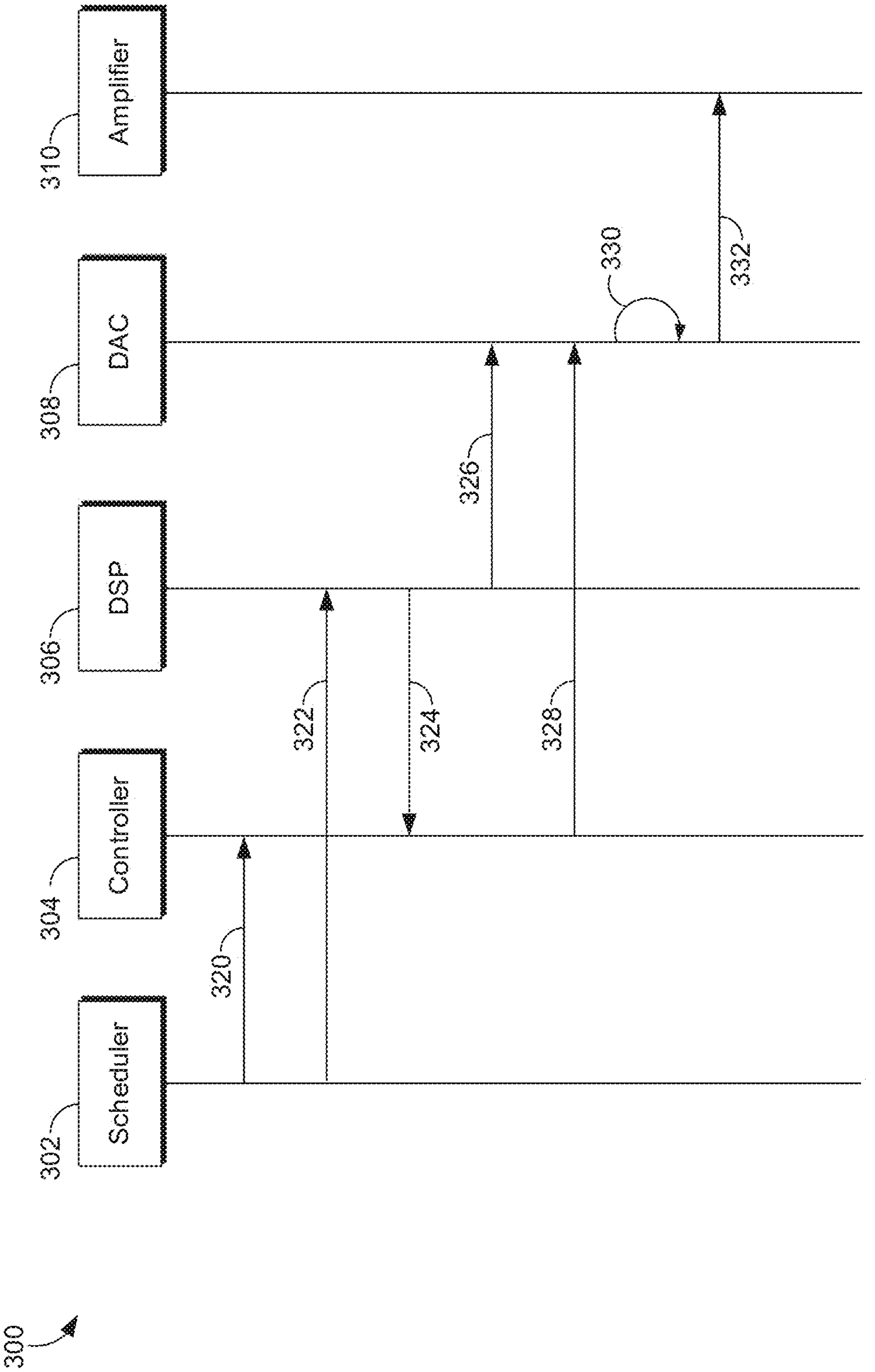
FIG. 3 illustrates an exemplary flow diagram for mitigating energy transmission in which implementations of the present disclosure may be employed.

FIG. 3 illustrates an example flow diagram for mitigating energy transmitted on subcarriers in a communications network in accordance with aspects herein. The components discussed may be the same or similar to previous components discussed with regards to FIGS. 1-2. At a first step 320, a scheduler 302 may send scheduling data to a controller 304. For example, after the scheduler 302 determines the allocation of PRBs for the upcoming transmission cycle, including deciding which PRBs will be used for active data transmission and which will be blanked, it may then prepare a data packet containing the scheduling data. The scheduling data may contain a list of active PRBs designated for data transmission and a list of blanked PRBs, as well as timing information to help ensure synchronization with other network components. Upon receiving the scheduling data from the scheduler 302, the controller 304 may acknowledge the scheduling data and confirm it has the necessary information to proceed with mitigating residual energy within the blanked PRBs. At a second step 322, the scheduler 302 may send the scheduling data to a DSP 306. The DSP 306 may use the scheduling data to correctly process the signal and prepare it for analog conversion. For example, the DSP 306 may process the digital waveform based on the allocated PRBs.

At a third step 324, which may be in lieu of the first step 320, the DSP 306 may send digital signal data to the controller 304. This digital signal data may include detailed information about the modulated signal, such as frequency components, amplitudes, and the exact structure of both active and blanked PRBs. This communication may be conducted through a dedicated data link or a shared bus within a network infrastructure. By supplying the digital signal data to the controller 304, the DSP 306 helps enable the controller 304 to accurately generate a compensating waveform that will destructively interfere with any residual energy in the blanked PRBs.

At a fourth step 326, after the DSP 306 has completed processing the digital signal, the DSP 306 sends this signal (e.g., digital waveform) to the DAC 308. The DSP 306 may communicate the signal to the DAC 308 via a high-speed data link. This signal may contain the structured data for the transmission, which is ready to be converted to an analog signal at the DAC 308. The DAC 308 receives this signal and translates it into a continuous analog waveform that mirrors the digital structure provided by the DSP 306 (e.g., an output of the DAC 306).

At a fifth step 328, the controller 304 may determine which part of the DAC 308 output comprises blanked PRBs and generating a compensating waveform. For example, upon receiving the scheduling data and/or the digital signal data, the controller 304 may analyze this information and determine the specific sections of the waveform that correspond to the blanked PRBs. This analysis may include examining the frequency components and amplitudes to pinpoint the residual energy within these blanked PRBs. Once the controller 304 has identified the blanked PRBs in the output of the DAC 308, it may proceed to generate the compensating waveform designed to destructively interfere with the residual energy present in the blanked PRBs. To achieve this, the controller may calculate the necessary amplitude and phase characteristics of the compensating waveform to help ensure it is an inverse of the residual energy within the blanked PRBs.

At a sixth step 330, the compensating waveform generated by the controller 304 may be summed with the output of the DAC 308 to produce a summed waveform. The summing may be done with a process of coherent summing. In this way, the controller 304 may help ensure that the compensating waveform generated by the controller 304 is synchronized with the residual energy in the blanked PRBs in the output of the DAC 308. When the two signals are summed, the peaks and troughs may align such that the residual energy may be effectively canceled out through destructive interference. The result may be a summed waveform as a modified analog signal where the blanked PRBs exhibit minimal residual energy. This summed waveform may maintain the integrity of the active PRBs, which contain the intended data for transmission. By eliminating the unwanted residual energy, the summed waveform is cleaner and more efficient for transmission.

At a seventh step 332, after the controller 304 has summed the compensating waveform with the output of the DAC 308, the summed waveform with minimal residual energy in the blanked PRBs may be sent to an amplifier 310. The amplifier may be responsible for boosting the signal to the necessary power level for transmission. By amplifying the summed signal, rather than the original output of the DAC 308, a communications network can help ensure that transmitted signals maintain high quality with minimal interference.

Figure 4:
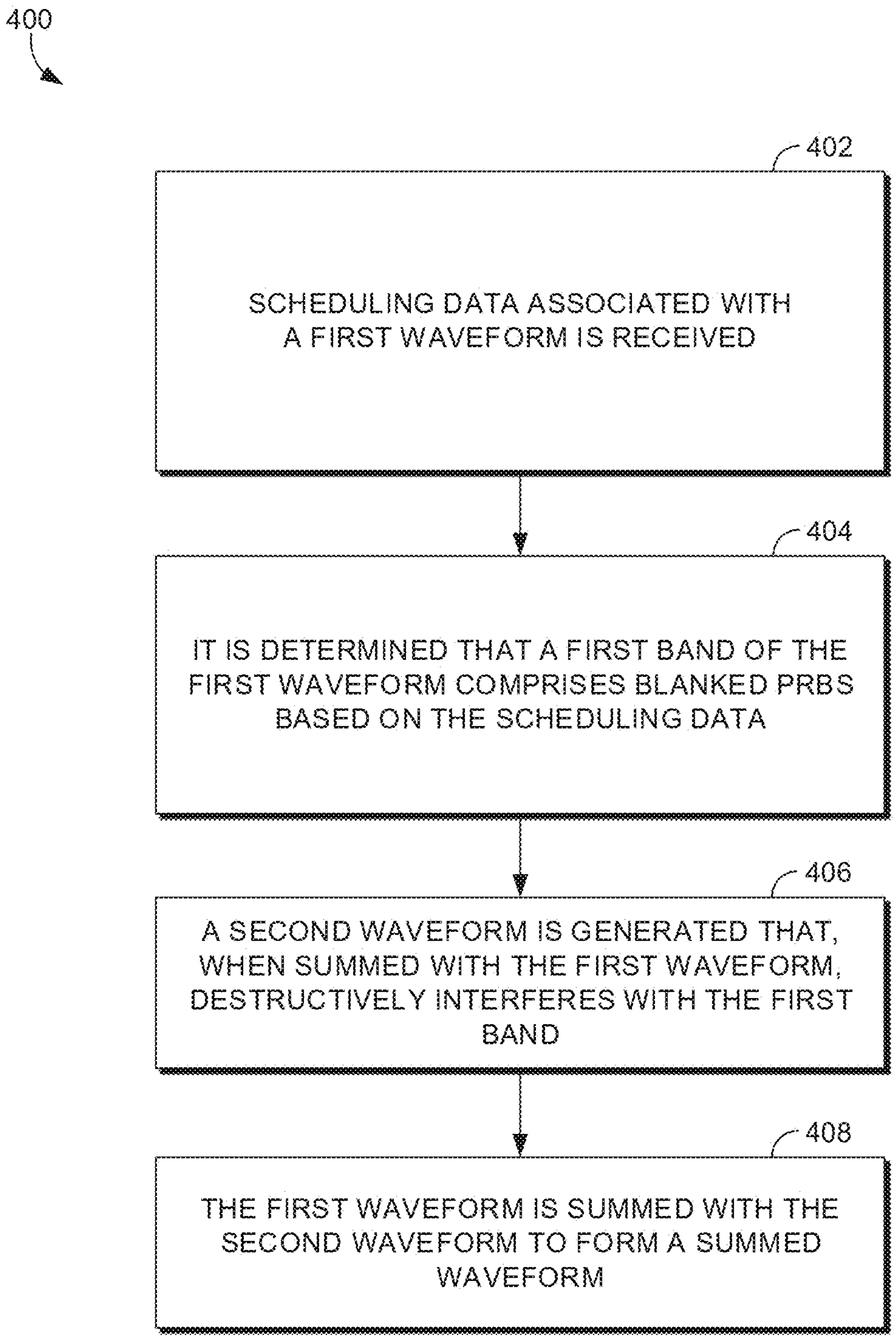
FIG. 4 illustrates a flow chart of an exemplary method for mitigating energy transmission in which implementations of the present disclosure may be employed.

Turning now to FIG. 4, a flow chart is provided that illustrates one or more aspects of the present disclosure relating to a method 400 for mitigating energy transmitted on subcarriers in a communications network. At a first step 402, scheduling data associated with a first waveform is received. At a second step 404, it is determined that a first band of the first waveform comprises blanked PRBs based on the scheduling data. In some aspects, the first waveform may further comprise a second band comprising non-blanked PRBs. At a third step 406, a second waveform is generated that, when summed with the first waveform, destructively interferes with the first band. At a fourth step 408, the first waveform is summed with the second waveform to form a summed waveform.

Figure 5:
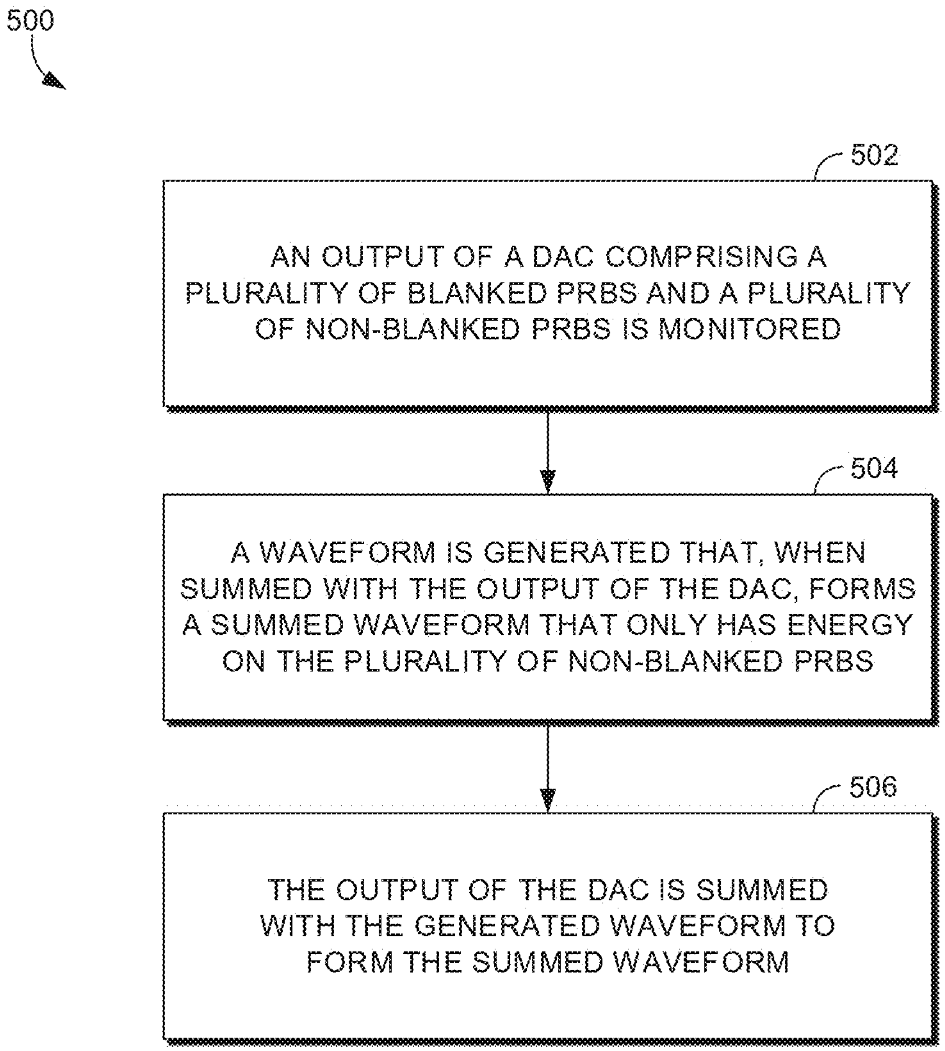
FIG. 5 illustrates a flow chart of an exemplary method for mitigating energy transmission in which implementations of the present disclosure may be employed.

Turning now to FIG. 5, a flow chart is provided that illustrates one or more aspects of the present disclosure relating to a method 500 for mitigating energy transmitted on subcarriers in a communications network. For example, at a first step 502, an output of a DAC comprising a plurality of blanked PRBs and a plurality of non-blanked PRBs is monitored. At a second step 504, a waveform is generated that, when summed with the output of the DAC, forms a summed waveform that only has energy on the plurality of non-blanked PRBs. At a third step 506, the output of the DAC is summed with the generated waveform to form the summed waveform.

Figure 6:
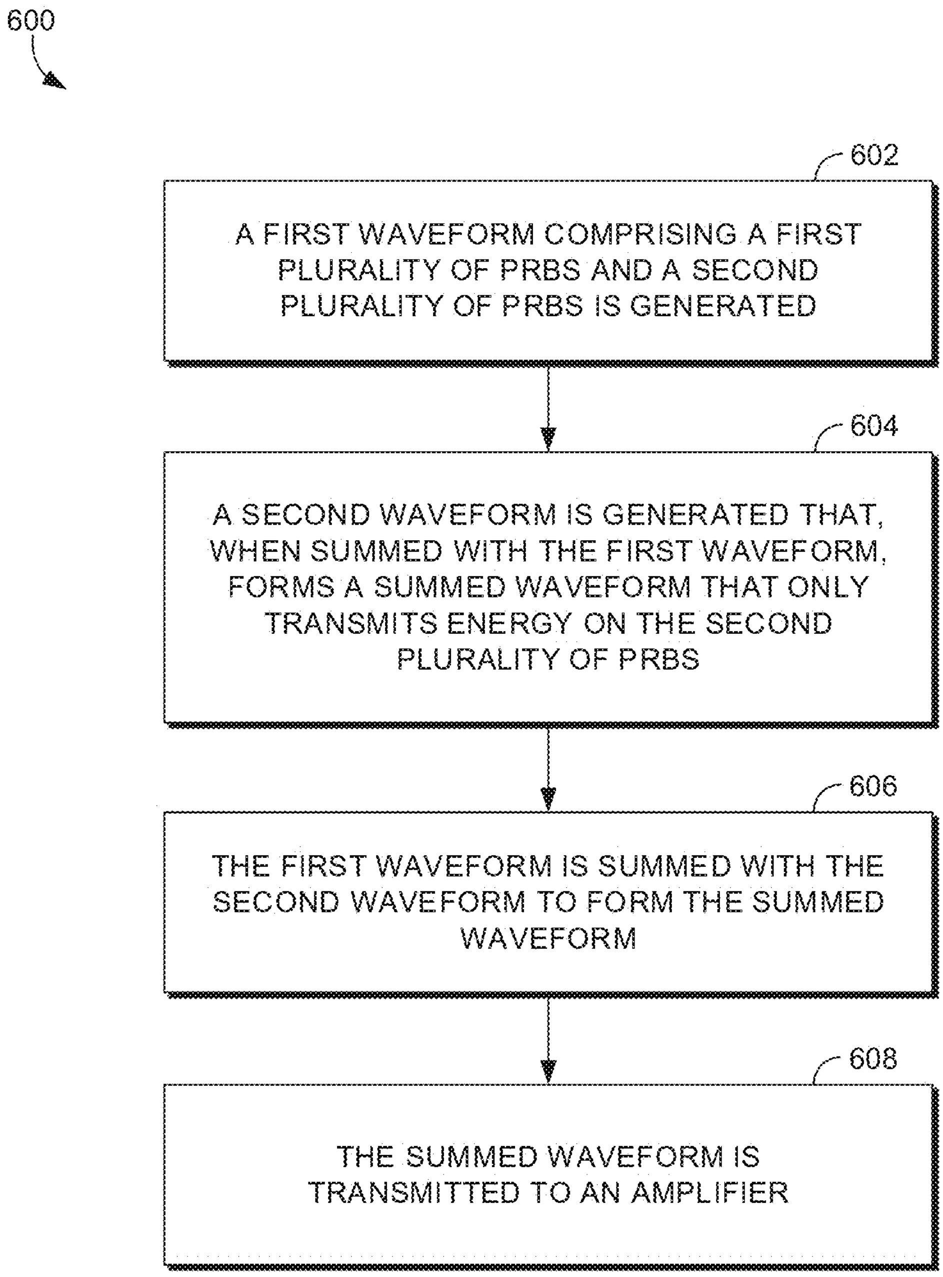
FIG. 6 illustrates a flow chart of an exemplary method for mitigating energy transmission in which implementations of the present disclosure may be employed.

Turning now to FIG. 6, a flow chart is provided that illustrates one or more aspects of the present disclosure relating to a method 600 for mitigating energy transmitted on subcarriers in a communications network. For example, at a first step 602, a first waveform comprising a first plurality of PRBs and a second plurality of PRBs is generated. At a second step 604, a second waveform is generated that, when summed with the first waveform, forms a summed waveform that only transmits energy on the second plurality of PRBs. At a third step 606, the first waveform is summed with the second waveform to form the summed waveform. At a fourth step 608, the summed waveform is transmitted to an amplifier. In some aspects the first plurality of PRBs comprises only blanked PRBs. In some aspects, the second waveform destructively interferes with the first plurality of PRBs.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for mitigating energy transmitted on subcarriers in a communications network, the system comprising:

a transceiver module;

a network device comprising one or more processors; and a non-transitory computer-readable media comprising executable instructions that, when executed, causes the network device to perform operations in the communications network, the executable instructions comprising the steps of:

receiving scheduling data associated with a first waveform;

determining, based on the scheduling data, that a first band of the first waveform comprises blanked Physical Resource Blocks (PRBs);

generating a second waveform that, when summed with the first waveform, destructively interferes with the first band; and summing the first waveform with the second waveform to form a summed waveform.

2. The system of claim 1 further comprising transmitting the summed waveform to an amplifier.

3. The system of claim 1, wherein the summed waveform is formed prior to an amplification process.

4. The system of claim 1, wherein the scheduling data comprises digital signal data associated with the first waveform.

5. The system of claim 1, wherein the second waveform is predicted using the scheduling data associated with the first waveform.

6. The system of claim 5, wherein the second waveform is predicted using digital signal data associated with the first waveform.

7. The system of claim 1, wherein the first waveform comprises a second band comprising non-blanked PRBs.

8. The system of claim 7, wherein the second waveform does not destructively interfere with the second band.

9. The system of claim 1, wherein the first waveform is generated by a Digital to Analog Converter (DAC) of the radio unit on a user equipment or a base station.

10. The system of claim 1, wherein the network device is a destructive signaling controller (DSC) on a user equipment or a base station.

11. The system of claim 1, wherein the second waveform comprises an inverse of the first band.

12. A non-transitory computer-readable media comprising executable instructions that, when executed, causes a network device comprising one or more processors to perform operations for mitigating energy transmitted on subcarriers in a communications network, the executable instructions comprising the steps of:

monitoring an output of a Digital to Analog Converter (DAC), the output comprising a plurality of blanked Physical Resource Blocks (PRBs) and a plurality of non-blanked PRBs;

generating a waveform that, when summed with the output of the DAC, forms a summed waveform that only has energy on the plurality of non-blanked PRBs; and summing the output of the DAC with the generated waveform to form the summed waveform.

13. The computer-readable media of claim 12, wherein the output of the DAC is summed with the generated waveform prior to an amplification process.

14. The computer-readable media of claim 12 further comprising transmitting the summed waveform to an amplifier.

15. The computer-readable media of claim 14 further comprising transmitting the amplified summed waveform to an antenna array.

16. The computer-readable media of claim 12, wherein the output of the DAC is converted by the DAC based on a digital signal received from a Digital Signal Processing (DSP) component.

17. The computer-readable media of claim 12, wherein the DAC is located at a user equipment or a base station.

18. A method for mitigating energy transmitted on subcarriers in a communications network, the method comprising:

generating a first waveform, the first waveform comprising a first plurality of Physical Resource Blocks (PRBs) and a second plurality of PRBs;

generating a second waveform that, when summed with the first waveform, forms a summed waveform that only transmits energy on the second plurality of PRBs;

summing the first waveform with the second waveform to form the summed waveform; and transmitting the summed waveform to an amplifier.

19. The method of claim 18, wherein the first plurality of PRBs comprises only blanked PRBs.

20. The method of claim 18, wherein the second waveform destructively interfered with the first plurality of PRBs.

* * * * *